United States Patent
Takeda et al.

(10) Patent No.: US 11,902,958 B2
(45) Date of Patent: Feb. 13, 2024

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/492,414

(22) Filed: Oct. 1, 2021

(65) Prior Publication Data

US 2022/0030599 A1 Jan. 27, 2022

Related U.S. Application Data

(63) Continuation of application No. 16/624,539, filed as application No. PCT/JP2017/023105 on Jun. 22, 2017, now abandoned.

(51) Int. Cl.
 *H04W 72/12* (2023.01)
 *H04W 24/10* (2009.01)
 (Continued)

(52) U.S. Cl.
 CPC ....... *H04W 72/1215* (2013.01); *H04W 24/10* (2013.01); *H04W 52/146* (2013.01);
 (Continued)

(58) Field of Classification Search
 CPC . H04W 24/10; H04W 52/50; H04W 72/1268; H04W 72/1289; H04W 52/146; H04W 72/1215; H04W 74/0833; H04W 72/04; H04W 72/12; H04W 52/14; H04W 52/18; H04W 52/24; H04W 52/54;
 (Continued)

(56) References Cited

U.S. PATENT DOCUMENTS

2013/0194981 A1* 8/2013 Wang ............... H04L 5/1469
370/280
2015/0365157 A1* 12/2015 Yang ............... H04W 74/006
370/329

(Continued)

FOREIGN PATENT DOCUMENTS

WO 2015045775 A1 4/2015

OTHER PUBLICATIONS

CMCC; "Discussion on uplink measurement based mobility"; 3GPP TSG-RAN WG2 Meeting #95, R2-165213; Göteborg, Sweden; Aug. 22-26, 2016 (4 pages) (Year: 2016).*

(Continued)

*Primary Examiner* — Nathan S Taylor
(74) *Attorney, Agent, or Firm* — Osha Bergman Watanabe & Burton LLP

(57) ABSTRACT

A terminal is disclosed communicating using a first carrier performing at least Downlink (DL) transmission and a second carrier performing only Uplink (UL) transmission. The terminal includes a receiver that receives an indication regarding a UL, the indication included in downlink control information (DCI) that is reported from the first carrier and a processor that transmits a UL signal using the UL based on the indication. In other aspects, a radio communication method, a base station, and a system are also disclosed.

11 Claims, 10 Drawing Sheets

(51) Int. Cl.
    *H04W 52/14* (2009.01)
    *H04W 52/50* (2009.01)
    *H04W 72/1268* (2023.01)
    *H04W 72/23* (2023.01)
(52) U.S. Cl.
    CPC ....... *H04W 52/50* (2013.01); *H04W 72/1268* (2013.01); *H04W 72/23* (2023.01)
(58) Field of Classification Search
    CPC ..... H04W 74/00; H04W 74/08; H04W 76/10; H04W 76/15; H04L 5/001; H04L 5/0094; H04L 5/1469; H04L 5/00
    See application file for complete search history.

(56) References Cited

U.S. PATENT DOCUMENTS

| | | | | |
|---|---|---|---|---|
| 2016/0242123 | A1* | 8/2016 | Harada | H04W 52/0206 |
| 2017/0164273 | A1* | 6/2017 | Hayashi | H04W 48/16 |
| 2018/0262993 | A1* | 9/2018 | Akkarakaran | H04W 52/42 |
| 2018/0376510 | A1* | 12/2018 | Sun | H04W 72/52 |
| 2019/0349983 | A1* | 11/2019 | Loehr | H04L 1/1819 |
| 2019/0357264 | A1* | 11/2019 | Yi | H04L 1/1819 |
| 2020/0068504 | A1* | 2/2020 | Yi | H04W 52/146 |
| 2020/0154496 | A1* | 5/2020 | Yi | H04W 76/15 |
| 2020/0221464 | A1* | 7/2020 | Nielsen | H04W 72/1268 |
| 2020/0274750 | A1* | 8/2020 | Yi | H04L 27/2613 |
| 2020/0314633 | A1* | 10/2020 | Tang | H04W 8/24 |
| 2020/0337038 | A1* | 10/2020 | Takeda | H04L 5/0053 |
| 2020/0383060 | A1* | 12/2020 | Park | H04W 52/42 |

OTHER PUBLICATIONS

LG Electronics; "Remaining details on UL sharing between LTE and NR"; 3GPP TSG RAN WG1 Meeting Ad-Hoc, R1-1710354; Qingdao, P.R. China; Jun. 27-30, 2017 (6 pages) (Year: 2017).*
CMCC; "Discussion on UL sharing of NR and LTE"; 3GPP TSG RAN WG1 Meeting #89, R1-1708403; Hangzhou, P.R. China; May 15-19, 2017 (3 pages) (Year: 2017).*
Qualcomm Incorporated; "Mobility considerations for NR"; 3GPP TSG-RAN WG2 Meeting #94, R1-164710; Nanjing, China; May 23-27, 2016 (3 pages) (Year: 2016).*
Office Action issued in the counterpart Japanese Patent Application No. 2019-524815, dated Sep. 14, 2021 (6 pages).
Huawei, HiSilicon; "Overview of NR UL for LTE-NR coexistence"; 3GPP TSG RAN WG1 Meeting #89, R1-1709383; Hangzhou, China; May 15-19, 2017 (15 pages).
Vivo; "Issues on UL transmission for LTE-NR co-existence"; 3GPP TSG RAN WG1 NR Ad-Hoc#2, R1-1710385; Qingdao, P.R. China; Jun. 27-30, 2017 (5 pages).
Huawei, HiSilicon; "Overview of NR UL for LTE-NR coexistence"; 3GPP TSG RAN WG1 NR Ad Hoc Meeting, R1-1709979; Qingdao, China; Jun. 27-30, 2017 (12 pages).
3GPP TSG RAN WG1 Meeting NR Ad-Hoc#2; R1-1710250 "Discussion on UL sharing of NR and LTE" NEC; Qingdao, P.R. China; Jun. 27-30, 2017 (3 pages).
Office Action issued in Chinese Application No. 201780093905.X; dated Feb. 9, 2022 (14 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in International Application No. PCT/JP2017/023105, dated Sep. 12, 2017 (5 pages).
Written Opinion issued in International Application No. PCT/JP2017/023105; dated Sep. 12, 2017 (3 pages).
Extended European Search Report in counterpart European Application No. 17914400.1 dated Dec. 21, 2020 (10 pages).
CMCC; "Discussion on uplink measurement based mobility"; 3GPP TSG-RAN WG2 Meeting #95, R2-165213; Göteborg, Sweden; Aug. 22-26, 2016 (4 pages).
LG Electronics; "Remaining details on UL sharing between LTE and NR"; 3GPP TSG RAN WG1 Meeting Ad-Hoc, R1-1710354; Qingdao, P.R. China; Jun. 27-30, 2017 (6 pages).
CMCC; "Discussion on UL sharing of NR and LTE"; 3GPP TSG RAN WG1 Meeting #89, R1-1708403; Hangzhou, P.R. China; May 15-19, 2017 (3 pages).
Qualcomm Incorporated; "Mobility considerations for NR"; 3GPP TSG-RAN WG2 Meeting #94, R1-164710; Nanjing, China; May 23-27, 2016 (3 pages).
Office Action issued in Chinese Application No. 201780093905.X; dated Jul. 11, 2022 (14 pages).
Office Action issued in Australian Application No. 2017419917 dated Sep. 21, 2022 (4 pages).
Huawei, HiSilicon, "Considerations of NR UL operation on the uplink band of LTE", 3GPP TSG RAN WG1 NR Ad-Hoc Meeting, R1-1700032, Spokane, USA, Jan. 16-20, 2017 (6 pages).
Samsung, "RRC signalling to support LTE+NR Co-existence" 3GPP TSG-RAN WG2 Ad-hoc, R2-1706885, Qingdao, China, Jun. 27-29, 2017 (6 pages).
Notice of Reasons for Refusal issued in Japanese Application No. 2021-185505 dated Sep. 20, 2022 (6 pages).
Office Action issued in Chinese Application No. 201780093905.X; dated Jan. 5, 2023 (14 pages).

* cited by examiner

USER TERMINAL AND RADIO COMMUNICATION METHOD

CROSS-REFERENCE TO RELATED APPLICATIONS

This application is a continuation application of U.S. application Ser. No. 16/624,539, filed on Dec. 19, 2019, which is a national phase application of PCT/JP2017/023105 filed on Jun. 22, 2017. The entire contents of these applications are hereby incorporated by reference.

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th Generation mobile communication system)," "NR (New RAT (Radio Access Technology))," "LTE Rel. 14 and later versions," etc.) are under study.

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 cell (CC, cell, etc.). In DC, since a number of CCs of different radio base stations are integrated, DC is also referred to as "inter-eNB CA."

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, 5G, NR, etc.), RATs (also referred to as "5G," "NR" or "second RAT") different from existing radio access technologies (RAT) (also referred to as "LTE " or "first RAT" etc.) will be adopted. Also, regarding the mode of operation in the future radio communication system, the stand-alone mode that operates independently without linking to the existing RAT and the non-stand-alone mode (NSA) that operates with linking to the existing RAT are anticipated.

Envisaging future radio communication systems, how to communicate using a plurality of carriers including a carrier used exclusively for UL transmission (UL transmission only) is under study. The mode in which only UL transmission is performed is also referred to as "SUL (Supplemental UpLink)".

However, the problem that DL signals are not transmitted in the SUL carrier is how to configure the SUL carrier to the UE.

The present invention has been made in view of the above, and it is therefore an object of the present invention to provide user terminal and radio communication method, whereby, when using a SUL (Supplemental UpLink) carrier, the SUL carrier can be properly configured.

Solution to Problem

A user terminal according to one example of the present invention has a user terminal that communicates using at least a first carrier performing DL transmission and a second carrier performing only UL transmission, and has a receiving section that receives UL transmission command information reported from the first carrier, and a control section that exerts control so that a UL measurement signal is transmitted to the second carrier based on the UL transmission command information.

Advantageous Effects of Invention

According to the present invention, when using the SUL (Supplemental UpLink) carrier, the SUL carrier can be appropriately configured to the user terminal.

DESCRIPTION OF EMBODIMENTS

Figure 1:
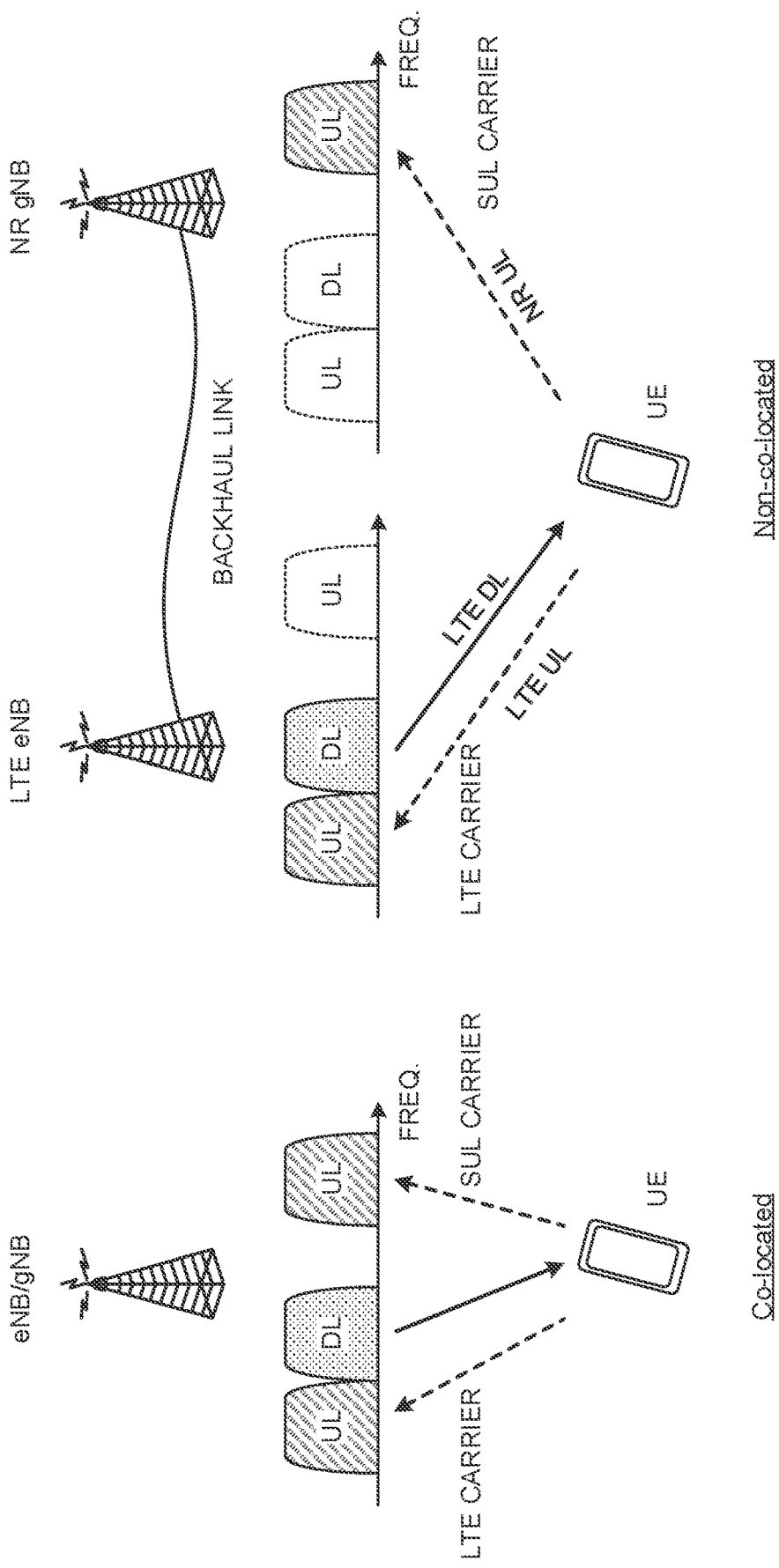
FIGS. 1A and 1B are diagrams to show an example of communication with a plurality of carriers including SUL carriers.

FIGS. 1A and 1B are diagrams to show an example of a radio communication system using a plurality of carriers including a SUL (Supplemental UpLink) carrier. Here, although a first carrier performing DL transmission and UL transmission and a second carrier performing SUL transmission are exemplified, the number of carriers that can be applied is not limited to this.

FIG. 1A is a diagram to show a radio communication system in which a UE connects with stand-alone cell in which the SUL carrier is an LTE and/or NR carrier (for example, carrier aggregation (CA)). In the radio communication system shown in FIG. 1A, one or more carriers (cells) of LTE (first carrier) and a SUL carrier (carrier in one or more carriers of NR) (second carrier) are configured in the user terminal UE.

In the radio communication system shown in FIG. 1A, LTE carriers and SUL carriers are subjected to CA (Co-located). The radio base station (eNB and/or gNB) performs DL/UL transmission with the user terminal UE using the first carrier and performs UL transmission using the second carrier. Here, a case where the first carrier (first cell) is an LTE carrier (LTE cell) is shown, but an NR carrier (NR cell) may be used.

FIG. 1B is a diagram to show a radio communication system in which a UE connects with stand-alone cell in which the SUL carrier is an LTE and/or NR carrier (for example, Dual Connectivity (DC)). In the radio communication system shown in FIG. 1B, one or more carriers (cells) of LTE (first carrier) communicating with 1 radio base station (also referred to as "eNodeB (eNB)", "LTE eNB," "LTE base station", etc.) and SUL carrier (carrier in one or more carriers of NR) (second carrier) communicating with other radio base stations (also called "gNodeB (gNB)," "NR gNB," "NR base station," etc.) are configured in the user terminal UE.

In the radio communication system shown in FIG. 1B, LTE carriers and SUL carriers are configured to DC (Non-co-located). The radio base station eNB performs DL/UL transmission with the user terminal UE using the first carrier. The radio base station gNB performs UL transmission using the second carrier. Here, a case where the first carrier (first cell) is an LTE carrier (LTE cell) is shown, but an NR carrier (NR cell) may be used.

Also, in FIG. 1B, the LTE radio base station eNB and the NR radio base station gNB are connected by a backhaul link (for example, wired link such as X2 interface or wireless link). Therefore, even when the user terminal UE simultaneously connects to the LTE carrier (first carrier) and the SUL carrier (second carrier), the base stations can share information. Note that LTE base stations and NR base stations may be installed at the same location, or installed at geographically separate locations as shown in FIG. 1B.

One or more LTE carriers and one or more NR carriers are allocated to different frequency bands. The LTE carrier may be allocated to a relatively low frequency band such as, for example, at least one of 800 MHz, 1.7 GHz and 2.1 GHz. Also, NR carriers may be allocated to relatively high frequency bands such as, for example, 3 GHz or higher. A case is shown here in which SUL carrier is configured as NR carrier, but this is by no means limiting. The NR carrier (SUL carrier) may be allocated to relatively low frequency band, and the LTE carrier may be allocated to relatively high frequency band.

Also, a case will be shown here in which the first carrier (for example, LTE and/or NR carriers) adopts the frequency division duplex (FDD), and the LTE UL carrier and the LTE DL carrier are provided in different frequency bands. Obviously, the first carrier may adopt time division duplex (TDD), or the UL carrier and the DL carrier may be provided in the same frequency band.

Also, in the cases shown in FIG. 1A and FIG. 1B, 1 LTE carrier and 1 NR carrier are present respectively, two or more LTE carriers and NR carriers may be present. Also, an NR carrier may be configured instead of the LTE carrier. Also, in FIG. 1A and FIG. 1B, although LTE carrier's UL signal is transmitted at a relatively low frequency, and SUL carrier's UL signal is transmitted at a relatively high frequency, the present invention is not limited to this, and LTE carrier's UL signal may be transmitted at relatively high frequency and SUL carrier's UL signals may be transmitted at relatively low frequencies.

Envisaging future radio communication systems, how to communicate using a plurality of carriers including a carrier used exclusively for UL transmission (UL transmission only) is under study. Note that "carrier" may be read as "cell," "CC," "band," "transmission point" or "base station" or the like.

However, the problem that DL signals are not transmitted in the SUL carrier is how to configure the SUL carrier to the UE. For example, as shown in FIG. 1B, if carriers are Non-co-located and allocated to different frequency bands, the problem is how to configure the SUL carrier. For example, in the conventional LTE system (Rel.13 or earlier versions), measurement is performed using a synchronization signal and/or a reference signal included in the DL signal to detect a cell, but it is questionable how to detect SUL carriers that do not transmit DL signals. Also, in the conventional LTE system, path loss is estimated using DL signals (used for transmission power control and/or timing advance), but it is questionable how to estimate the path loss for SUL carriers.

So, the present inventors have focused on measuring UL using a predetermined UL signal and/or UL Channel (for example, measurement and/or path loss estimation), and come up with the idea of transmitting UL signal to SUL according to a transmission command from another carrier performing DL transmission.

That is, in the present embodiment, in a system using a SUL carrier, a UL signal is transmitted to the SUL according to a transmission command from another carrier performing DL transmission, so that when using a SUL carrier, the SUL carrier can be appropriately configured in a user terminal. Note that UL signals and/or Channels to be sent to the SUL according to commands from other DL carriers may be referred to as "measurement signal," "measurement Channel," "synchronization signal," "synchronization Channel," "synchronization/measurement signal" or "synchronization/measurement Channel" (hereafter referred to as "measurement signal").

Note that, when performing CA using multiple carriers including SUL carriers (SUL cell or SUL CC), the SUL carriers may be configured as a normal SCell, or configured as a PUCCH SCell that performs PUCCH transmission. When configuring SUL as PUCCH SCell, uplink control information (UCI) may be transmitted using the SUL carrier's PUCCH.

Alternatively, the SUL carrier may be designed not to transmit PUCCH (SUL carrier is not configured as PSCell). In this case, when a PUSCH is allocated in the SUL carrier, uplink control information may be included in the PUSCH and transmitted.

Note that, when performing CA using multiple carriers including SUL carriers (SUL cell or SUL CC), the SUL carriers may be configured as a normal SCell, or configured as a PCell that performs PUCCH transmission. When configuring SUL as PSCell, uplink control information (UCI) may be transmitted using the SUL carrier's PUCCH.

Alternatively, the SUL carrier may be designed not to transmit PUCCH (SUL carrier is not configured as PSCell). In this case, when a PUSCH is allocated in the SUL carrier, uplink control information may be included in the PUSCH and transmitted.

Now, embodiments of the present invention will be described below in detail with reference to the accompanying drawings. Note that, in the following, although it is assumed that one or more LTE carriers and one or more NR carriers are configured in the user terminal, the plurality of carriers according to the present embodiment are not limited to LTE carriers and NR carriers, as long as they are only carriers of varying RATs.

First Embodiment

In the present embodiment, the user terminal UE transmits a UL measurement signal to the carrier performing SUL transmission (SUL carrier) based on the UL transmission command information reported from the carrier performing the DL transmission (LTE carrier and/or NR carrier). The radio base station gNB performs measurement, path loss estimation and the like using the UL measurement signal. In the following description, although the case where a carrier performing DL transmission is an LTE carrier is considered, the present invention is not limited to this.

Figure 2:
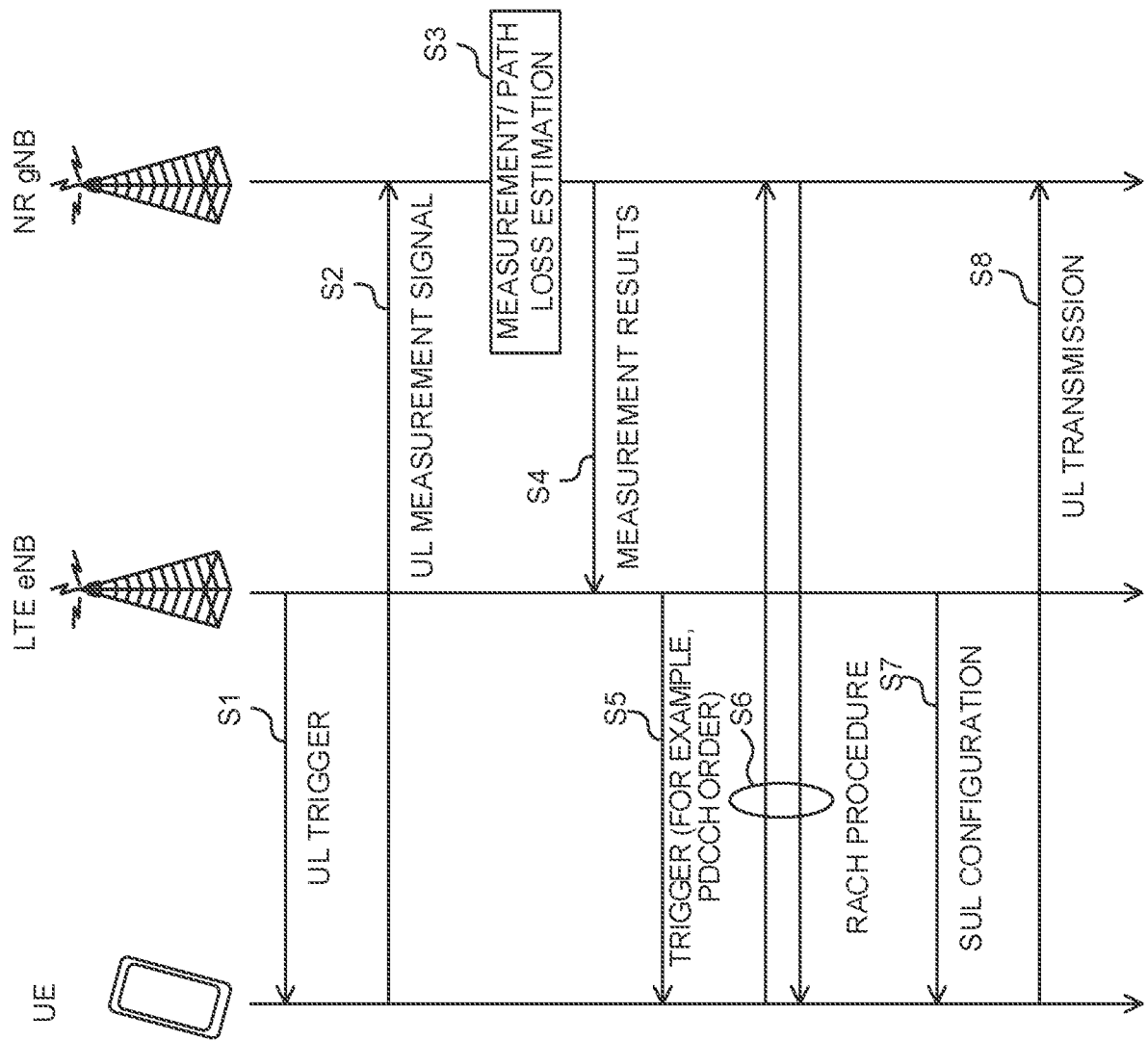
FIG. 2 is a sequence diagram to show an example of a radio communication method according to an example of the present invention.

The steps of the present embodiment will be described with reference to FIG. 2. FIG. 2 is a sequence diagram to show an example of a radio communication method according to an example of the present invention. The user terminal UE communicates with the carrier performing DL transmission and communicates with the carrier performing SUL transmission (for example, CA or DC). FIG. 2 shows the case in which the UE connects to a radio base station configured with at least a carrier performing DL transmission (LTE eNB) and a radio base station configured with a carrier performing SUL transmission (NR gNB). The LTE eNB and the NR gNB are connected by a backhaul link.

Note that, in FIG. 2, although carriers performing DL transmission are configured in LTE eNB, the present invention is not limited to this, and carriers performing DL transmission may be configured in NR gNB.

The user terminal UE transmits a UL measurement signal (also referred to as "UL synchronization signal", "UL synchronization/measurement signal", etc.) to the NR gNB using the SUL carrier (S2). In this case, as shown in FIG. 2, a trigger for transmitting a UL measurement signal (UL transmission command information: UL grant) may be transmitted from the LTE eNB to the user terminal UE (S1). This trigger may be transmitted in RRC (Radio Resource Control) signaling, MAC layer or downlink control information (DCI) (UE specific, group-common, etc.).

Since DL transmission does not occur in the SUL carrier, the user terminal UE cannot determine the transmission power of the UL measurement signal from the received signal. For this reason, it is desirable to transmit the initial transmission power (for example, reference power) to the user terminal UE. Therefore, the trigger for transmitting the UL measurement signal may include transmission power information. In this case, the LTE eNB may transmit transmission power information to a plurality of user terminals UE using a broadcast signal or the like.

For UL measurement signals, a contention-based resource such as RACH (Random Access Channel) may be used (especially when the user terminal UE cannot synchronize with NR gNB), an RACH preamble which is a non-contention-based resource may be used, and SRS (Sounding Reference Signal) or the like A UL reference signal may be used. Also, a signal of an existing LTE system may be used, and a new UL signal and/or a UL Channel may be used.

Note that configuration information for a UL measurement signal (radio resource information, transmission cycle, etc.) may be included in the above trigger signal, or configured in advance using a signal different from the trigger signal. For example, the operation of reporting configuration information for measurement signals for SUL through at least one of higher layer signaling, MAC layer signaling and physical layer signaling (for example, SO) may be separately provided before the trigger transmission in S1.

The NR gNB performs measurement and/or path loss estimation using the UL measurement signal from the user terminal (S3). The NR gNB transmits the measurement result and/or the path loss estimation result to the LTE eNB through the backhaul link (S4). The LTE eNB determines whether the next procedure is possible between the user terminal UE and the NR gNB based on the measurement result and/or the path loss estimation result.

If the LTE eNB determines that the next procedure is possible between the user terminal UE and the NR gNB, the LTE eNB transmits a trigger for the next procedure (for example, PDCCH order) to the user terminal UE (S5). This trigger may include transmission power information adjusted based on the measurement result and/or the path loss estimation result.

For example, when the next procedure is a RACH procedure, the trigger includes information on power for RACH preamble transmission. This allows the transmit power of the RACH preamble to be properly configured, so that it is possible to prevent the user terminal UE from performing unnecessary power ramping. Thus, the user terminal UE can control UL transmission power appropriately based on the information on UL transmission power adjusted based on the UL measurement signal. The LTE gNB may transmit the measurement result and/or the path loss estimation result to the user terminal UE.

On the other hand, if the LTE eNB determines that the next procedure is not possible between the user terminal UE and the NR gNB, the LTE eNB may transmit again a trigger for transmitting the UL measurement signal from the LTE eNB to the user terminal UE (S1), and the user terminal UE may transmit the UL measurement signal to the NR gNB using the SUL carrier (S2).

After the trigger of S5, the next procedure, the RACH procedure, is performed between the user terminal UE and the NR gNB (S6). That is, the user terminal UE starts the random access procedure for the SUL carrier according to the command from the LTE carrier.

To be more specific, the user terminal UE transmits a PRACH (message 1) to the NR gNB. Then, NR gNB sends a RACH response (message 2) to the LTE eNB via the backhaul link, and LTE eNB transmits the RACH response (message 2) to the user terminal UE in the DL signal. Then, the user terminal UE transmits a message 3 to the NR gNB.

Then, NR gNB sends a message 4 to the LTE eNB via the backhaul link, and LTE eNB transmits the message 4 to the user terminal UE in the DL signal.

Since DL transmission cannot be performed in SUL, DL transmission (messages 2 and 4) of the random access procedure is performed using another DL carrier. This enables a random access procedure with the SUL. Also, allocation of downlink control information (PDCCH) transmitted using a DL carrier here may be controlled differently depending on whether the downlink control information is for DL carrier or for SUL, or shared.

When controlling the allocation by distinguishing whether the downlink control Channel is for DL carrier or for SUL, a control resource set (CORESET) for the DL carrier and a control resource set for the SUL may be configured in the DL carrier.

The control resource set is a candidate range for allocating a control Channel, which is provided in a part of a system band, and each user terminal may selectively monitor a set of control resources configured for itself. Control resource set is also referred to as "control resource set," "control sub-band," "search space set," "search space resource set," "control field," "control subband," and "NR-PDCCH field," etc.

Also, multiple control resource sets may be configured for each UE. In this case, a control resource set may be provided in the varying ranges for allocating the downlink control Channel for the DL carrier (first carrier) and the downlink control Channel for the SUL carrier (second carrier). Thereby, allocation of downlink control Channel for DL carrier and downlink control Channel for SUL carrier can be distinguished and controlled.

Note that, when performing the RACH procedure on the LTE carrier, the user terminal UE is controlled not to perform the RACH procedure on the SUL carrier. Note that, when performing the RACH procedure on the LTE carrier, the user terminal UE is controlled not to perform the RACH procedure on the SUL carrier.

When the UL signal is simultaneously transmitted from the user terminal UE in the RACH procedure, the priority in UL transmission may be predetermined. Regarding the criteria of priority, for example, priority may be set forth between RATs, and priority may be set forth between Channels. To be more specific, when priority may be set forth between RATs, LTE Channels may be prioritized. Also, when priority may be set forth between Channels, the priority may be configured in the order of PRACH, uplink control Channel (for example, ACK/NACK), and uplink shared Channel.

Thereafter, the LTE eNB configures SUL for the user terminal UE (S7), and the user terminal UE performs SUL transmission (S8).

Although case in which UL measurement signal is transmitted from user terminal UE to NR gNB, and measurement and/or path loss estimation is performed using UL measurement signal in NR gNB has been described above, the present embodiment is not limited to this. For example, the RACH preamble may be used as a UL measurement signal. That is, a RACH preamble may be transmitted from the user terminal UE to the NR gNB, and measurement and/or path loss estimation may be performed using the RACH preamble in the NR gNB. In this case, information on the transmission power (for example, reference power) of the RACH preamble may be included in the trigger from the LTE eNB (S1). Alternatively, S1 to S4 may be omitted and information on the transmission power of the RACH preamble may be included in the trigger signal for random access of S5, or may be configured in another signal in advance.

The NR gNB transmits the measurement result and/or the path loss estimation result to the LTE eNB through the backhaul link. At this time, the NR gNB may transmit the RACH response (message 2) to the LTE eNB together with the measurement result and/or the path loss estimation result, or may transmit them individually. The LTE eNB determines whether to proceed to the next procedure based on the measurement result and/or the path loss estimation result, and if it is determined that it can proceed to the next procedure, the LTE eNB may transmit a trigger to the user terminal UE. In this case, the LTE eNB transmits the RACH response (message 2) to the user terminal UE together with or separately from the trigger. The RACH response may also be used to trigger subsequent operations. Further, in this case, the transmission power control information for the user terminal, which is obtained based on the path loss estimation result, may be included in the message 2.

As described above, when the RACH preamble is used as a UL measurement signal, steps for configuring the SUL carrier can be simplified.

Second Embodiment

In the present embodiment, UL transmission timing for the SUL carrier is controlled based on the information transmitted from the LTE carrier.

The timing of the UL transmission for the SUL carrier is preferably derived from the RACH based on the DL signal of the carrier different from the SUL carrier (for example, LTE and/or NR carrier performing DL transmission). In this case, the base station may report, to the user terminal, information on a relative timing difference when the LTE carrier's DL signal (relatively low frequency RACH) and the SUL UL signal (relatively high frequency RACH) are compared as a TA (Timing Advance) command of the SUL. In this case, the base station may report, to the user terminal, information on a relative timing difference when the LTE carrier's DL signal (relatively low frequency RACH) and the SUL UL signal (relatively high frequency RACH) are compared as a TA (Timing Advance) command of the SUL.

The user terminal judges and controls the transmission timing (timing advance, TA group, etc.) of the SUL UL signal based on the timing information reported from the base station.

In addition, UL scheduling (for example, UL data transmission (initial transmission) and/or HARQ timing (for example, retransmitting timing of UL data etc.)) in SUL may be reported to the user terminal from another DL carrier.

Figure 3:
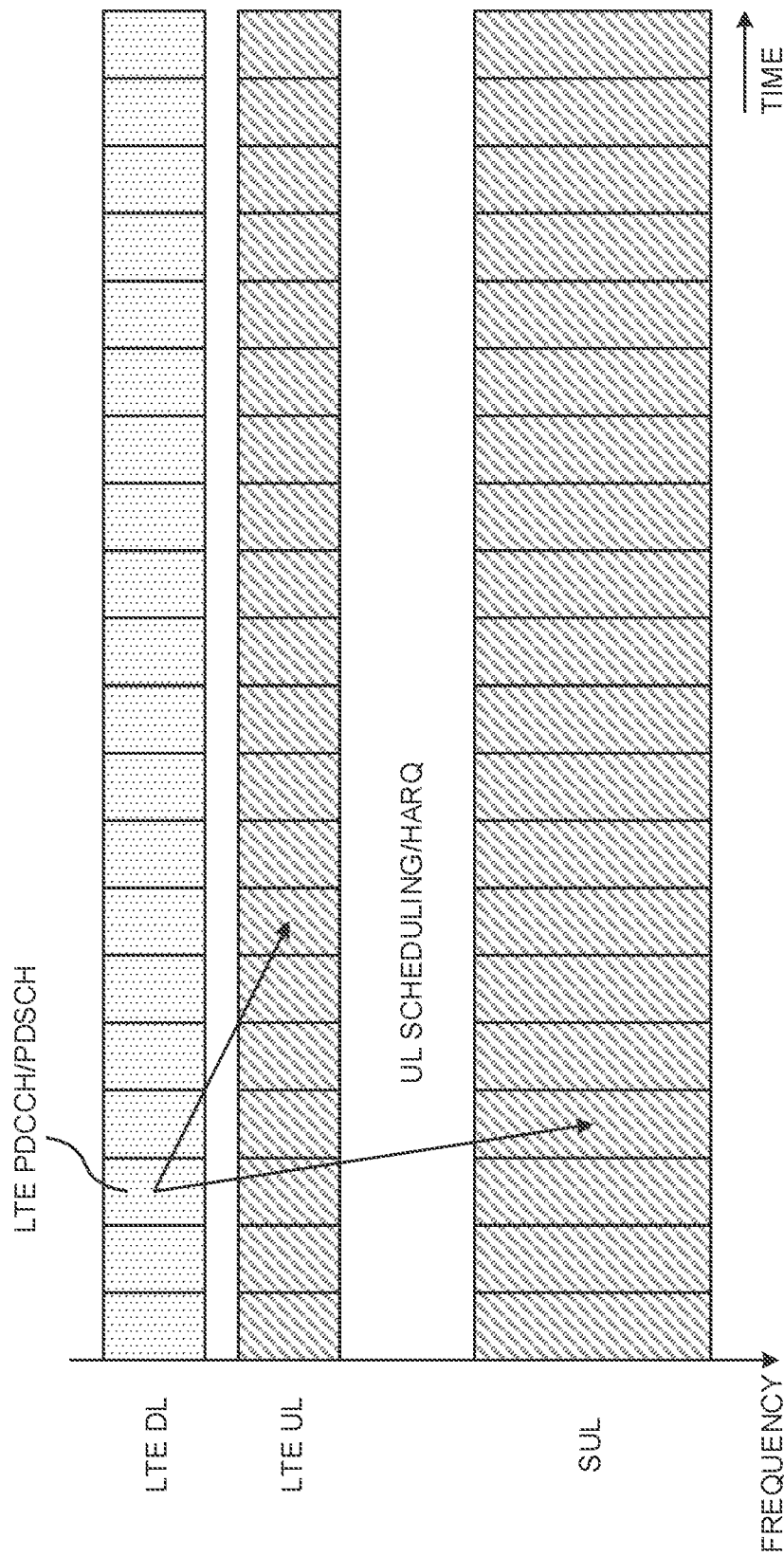
FIG. 3 is a diagram to explain SUL scheduling and HARQ timing in a radio communication method according to an example of the present invention.

FIG. 3 is a diagram to explain SUL scheduling and HARQ timing in a radio communication method according to an example of the present invention. The scheduling and/or HARQ timing for the SUL is indicated to the user terminal UE by the LTE carrier's DL signal (for example, downlink control information). That is, as shown in FIG. 3, the base station (for example, LTE eNB) indicates scheduling and/or HARQ timing for SUL to the user terminal UE in the LTE carrier's DL signal (PDCCH and/or PDSCH).

The LTE eNB indicates scheduling and/or HARQ timing for SUL to the user terminal UE in the LTE carrier's DL signal (PDCCH and/or PDSCH). In particular, when using a PDCCH (downlink control information) of a predetermined carrier as a DL signal, the SUL may be scheduled including a field showing a cell index (CIF (Cell Index Field)) in downlink control information.

Note that the SUL carrier's scheduling and/or HARQ timing may be according to the timing on the NR carrier (for example, may use a shorter short TTI than in LTE).

Also, when scheduling SUL, the LTE carrier's UL transmission and SUL may be scheduled to be simultaneous transmission.

Also, when scheduling SUL, the LTE carrier's UL transmission and SUL may be scheduled to be single UL transmission. In this case, by controlling UL scheduling for the LTE carrier and the SUL carrier based on DCI transmitted from the LTE eNB, it is possible to avoid simultaneous UL transmission in the LTE carrier and the SUL.

Figure 4:
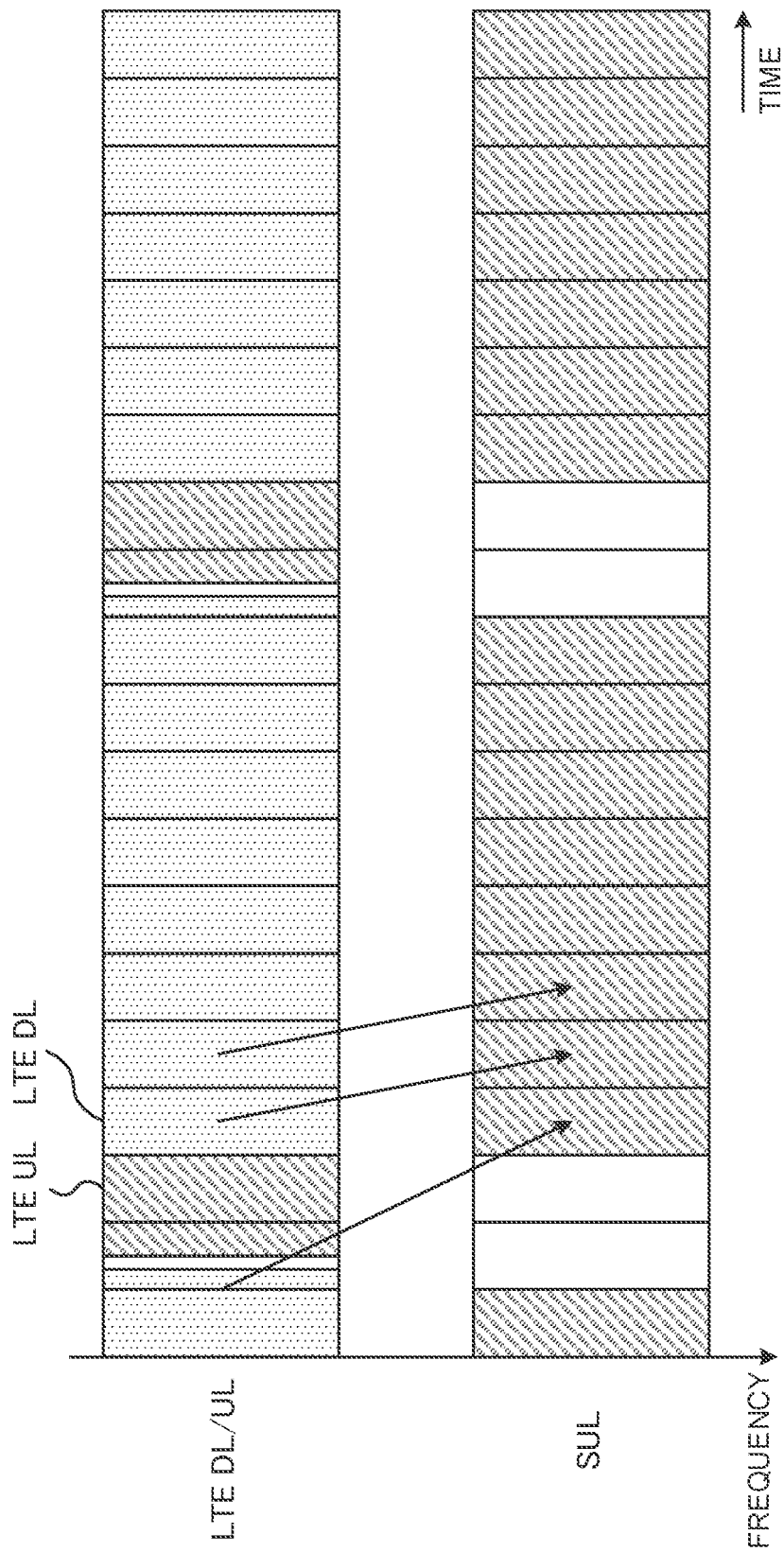
FIG. 4 is a diagram to explain SUL scheduling and HARQ timing in a radio communication method according to the present invention example.

Also, if TDD is used on a different carrier from the SUL (for example, LTE carrier) carrier in the design to avoid simultaneous transmission, control may be exerted so that UL transmission for SUL carrier is not performed in UL subframe of LTE carrier (see FIG. 4.).

For example, if the LTE carrier uses TDD, when the LTE carrier's UL transmission and the SUL are scheduled as 1 UL transmission (to avoid simultaneous UL transmissions), the SUL is not scheduled in the subframe where the LTE carrier's UL transmission occurs. In addition, SRS transmission on the SUL carrier may be controlled not to be performed at the timing for UL transmission (UL subframe) on the LTE carrier.

The user terminal may control UL transmission timing on the assumption that UL transmission is not commanded (or UL transmission is not performed) on the SUL carrier in the UL subframe of the LTE carrier. Note that information on the UL transmission timing of the LTE carrier (for example, UL/DL configuration used in TDD) may be reported to the user terminal in advance.

Also, an NR carrier may be configured instead of the LTE carrier.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 5:
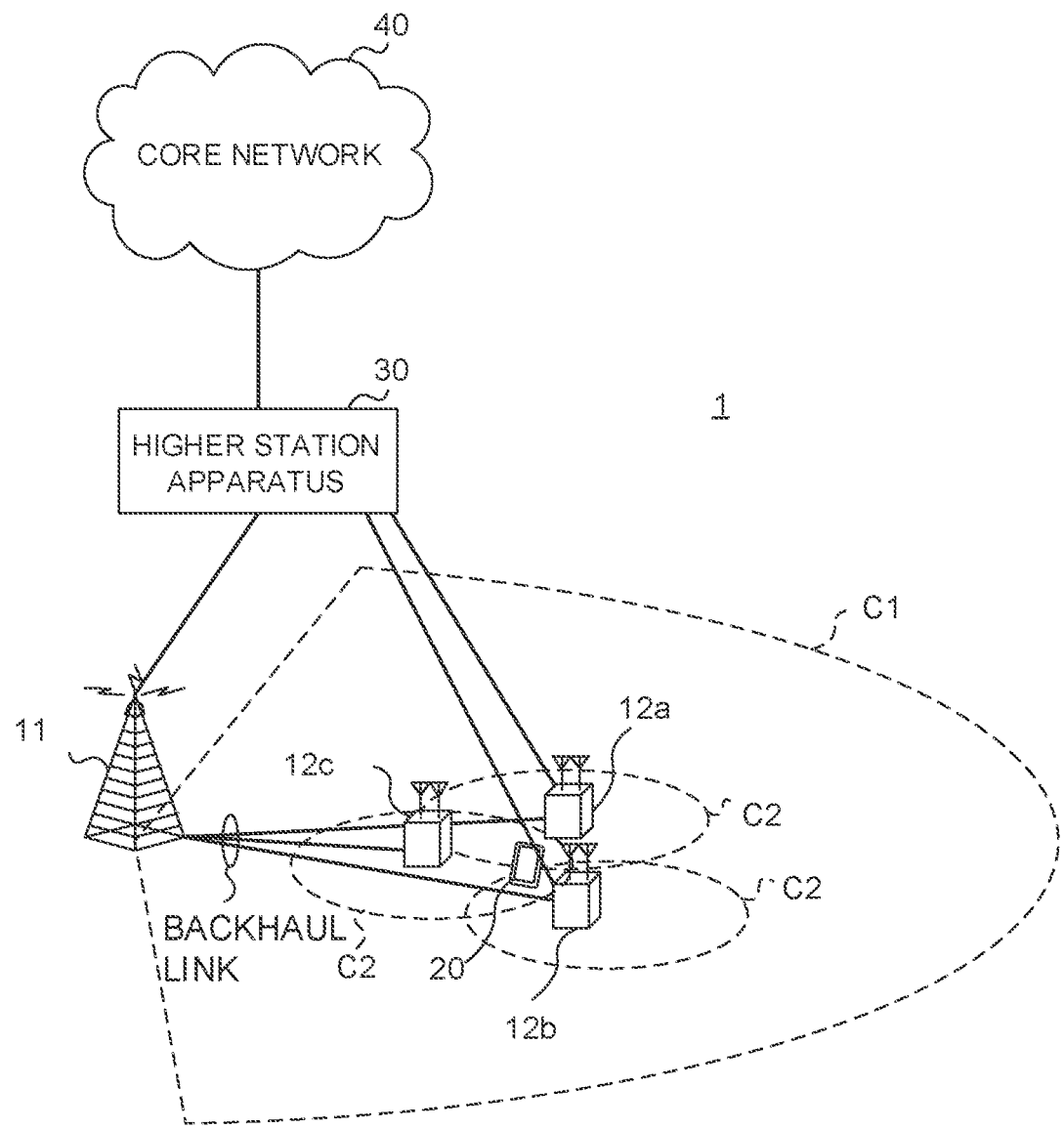
FIG. 5 is a diagram to show an exemplary schematic structure of a radio communication system according to the present embodiment.

FIG. 5 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be a non-stand-alone type (NR NSA) in which an existing RAT (for example, SUPER 3G, LTE-A (LTE-Advanced), IMT-Advanced or 4G) and a new RAT (for example, 5G, FRA (Future Radio Access) or NR (New RAT)) operate in cooperation.

The radio communication system 1 shown in FIG. 5 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different RAT and/or numerology between cells are applied may be adopted. Note that numerology may be RAT-specific communication parameters (for example, at least one of subcarrier spacing, symbol duration, CP duration, TTI length, etc.).

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), 1 or both of a TTI having a relatively long time length (for example, 1 ms) (also referred to as "sub-frame", "normal TTI," "long TTI," "normal sub-frame," "long sub-frame" or "slot", etc.) and a TTI having a relatively short time length ("short TTI," "Short subframe," "slot," "subslot" or "minislot" etc.) may be used. Also, in each cell, TTIs of different time lengths may be mixed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile/on the other hand, carriers in a frequency band higher than the existing carrier (for example, 3.5 GHz, 5 GHz, 30 to 70 GHz, etc.), or carriers in the same frequency band as the existing carrier may be used between the user terminal 20 and the radio base station 12. Note that the structure of the frequency band for use in each radio base station is by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between 2 radio base stations 12). In the radio communication system according to the present invention, as shown in FIG. 1B, a user terminal UE, an LTE eNB that performs DL transmission/UL transmission, and an NRgNB that receives a UL signal from the user terminal UE are connected by a backhaul link. Note that the LTE eNB may be substituted with NRgNB.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on.

Also, the LTE base station (LTE eNB) shown in FIG. 1 may be the radio base station 11 and/or the radio base station 12. Also, the LTE base station (LTE eNB) shown in FIG. 1 may be the radio base station 11 and/or the radio base station 12. Hereinafter the radio base stations 11 and 12 will be collectively referred to as "radio base stations 10," unless specified otherwise.

Each user terminal 20 is a terminal that supports one or more RATs such as at least one of LTE, LTE-A, NR, and 5G, and may be not limited to a mobile communication terminal, and may be a fixed communication terminal.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data Channel (PDSCH (Physical Downlink Shared Channel), also referred to as a DL shared Channel and/or the like), which is used by each user terminal 20 on a shared basis, a broadcast Channel (PBCH (Physical Broadcast Channel)), L1/L2 control Channels and so on are used as DL Channels. At least one of user data, higher layer control information, SIBs (System Information Blocks) and so forth is communicated in the PDSCH. Also, the MIB (Master Information Block) is communicated in the PBCH.

The L1/L2 control Channels include DL control Channels (such as PDCCH
(Physical Downlink Control Channel), EPDCCH (Enhanced Physical Downlink Control Channel), etc.), PCFICH (Physical Control Format Indicator Channel), PHICH (Physical Hybrid-ARQ Indicator Channel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH confirmation of receipt information (also referred to as "A/N," "HARQ-ACK," "HARQ-ACK bit," "A/N code book" and so on) can be communicated using at least one of the PHICH, the PDCCH and the EPDCCH.

In the radio communication system 1, a UL data Channel (PUSCH (Physical Uplink Shared Channel), also referred to as a UL shared Channel and/or the like), which is used by each user terminal 20 on a shared basis, an UL control Channel (PUCCH (Physical Uplink Control Channel)), a random access Channel (PRACH (Physical Random Access Channel)) and so on are used as UL Channels. User data, higher layer control information and so on are communicated by the PUSCH. Uplink control information (UCI), including at least one of PDSCH delivery acknowledgement information (A/N, HARQ-ACK, etc.), Channel state information (CSI) and so on, is communicated in the PUSCH or the PUCCH. By means of the PRACH, random access preambles for establishing connections with cells are communicated.

<Radio Base Station>

Figure 6:
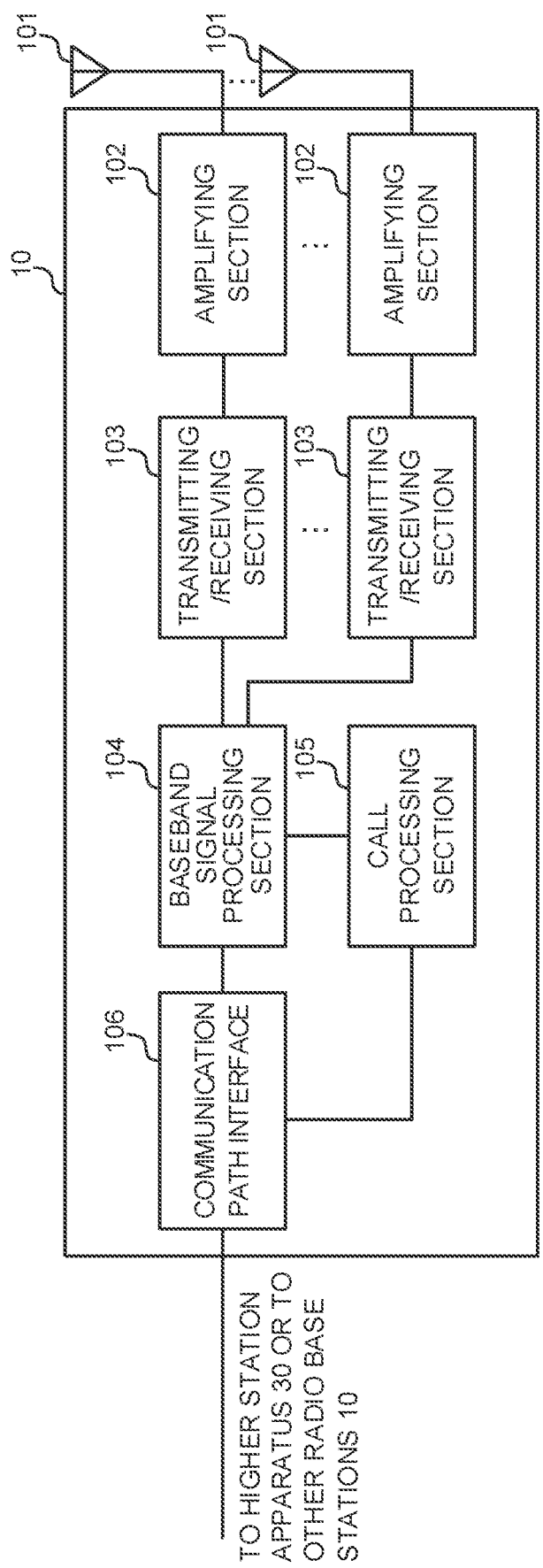
FIG. 6 is a diagram to show an exemplary overall structure of a radio base station according to the present embodiment.

FIG. 6 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be either an LTE base station or an NR base station.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, Channel coding, rate matching, scrambling, an inverse fast Fourier transform (IFFT) process and a precoding process, and the result is forwarded to each transmitting/receiving sections 103. Furthermore, downlink control signals are also subjected to transmission processes such as Channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving sections 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication Channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.). In the present embodiment, the communication path interface 106 can constitute a transmission section and/or a receiving section that transmits and/or receiving signals between other radio base stations 10.

Also, the transmitting/receiving sections 103 transmit a DL signal (for example, at least one of DCI (DL assignment to schedule DL data, and/or UL grant to schedule UL data), DL data, and DL reference signal) using an LTE DL carrier and/or an NR DL carrier. Also, the transmitting/receiving sections 103 receive UL signals (for example, at least one of UL data, UCI and UL reference signal) using LTE UL carriers and/or NR UL carriers. Note that the transmitting/receiving sections 103 in the radio base station configured with the SUL carrier receive only the UL signal.

The transmitting/receiving sections 103 of the LTE eNB transmit a trigger (UL transmission command information) for transmitting UL synchronization signal to NRgNB configured by SUL carrier to the user terminal UE, as necessary. In addition, the transmitting/receiving sections 103 of the LTE eNB transmit a trigger for proceeding to the next procedure to the user terminal UE, as necessary.

The DL signal may include an LTE DL signal and/or an NR DL signal. The UL signal may include an LTE UL signal and/or an NR UL signal.

Also, the transmitting/receiving sections 103 receive the delivery acknowledgement information (also referred to as "ACK/NACK," "A/N," "HARQ-ACK," "A/N Codebook," etc.) in response to the DL signal (LTE DL signal and/or NR DL signal). As to how often the retransmission control information is transmitted, for example, the retransmission control information may be transmitted per CB, per CBG, per TB or for every one or more TBs (that is, ACKs or NACKs may be indicated per CB, per CBG, per TB or for every one or more TBs). In addition, the transmitting/receiving sections 103 may transmit configuration information for the unit for retransmission of DL signals and/or UL signals.

Also, the communication path interface 106 of the NRgNB configured with the SUL carrier may transmit the UL signal for NR received in the SUL carrier to the LTE eNB via the backhaul link. Also, the communication path interface 106 of the LTE eNB may transmit data, control information, and the like to the NR gNB via the backhaul link (for example, X2 interface). Also, the communication path interface 106 of the LTE eNB may transmit data, control information, and the like to the NR gNB via the backhaul link (for example, X2 interface).

Figure 7:
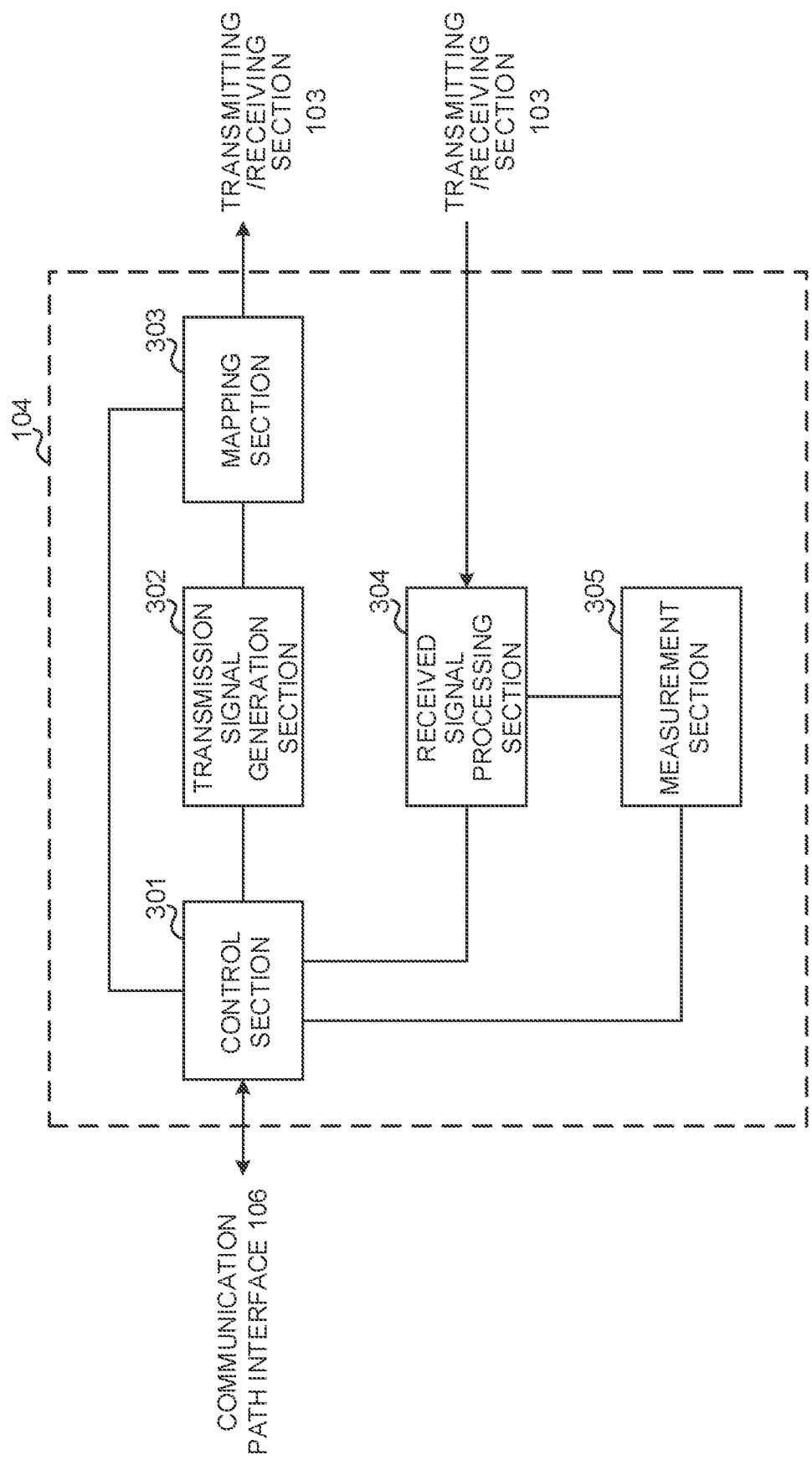
FIG. 7 is a diagram to show an exemplary functional structure of a radio base station according to the present embodiment.

FIG. 7 is a diagram to show an exemplary functional structure of a radio base station according to present embodiment. Note that, although FIG. 9 primarily shows functional blocks that pertain to characteristic parts of the present embodiment, the radio base station 10 has other functional blocks that are necessary for radio communication as well. As shown in FIG. 7, the baseband signal processing section 104 at least has a control section 301, a transmission signal generation section 302, a mapping section 303, a received signal processing section 304 and a measurement section 305. Each MAC entity of the present embodiment may be constituted by at least one of the control section 301, the transmission signal generation section 302, and the receive signal processing section 304.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 controls scheduling and/or transmission processing (for example, modulation, coding, transport block size (TBS) etc.) for the DL signal based on UCI transmitted as feedback from the user terminal 20. Also, when the TBS exceeds a predetermined threshold, the control section 301 may apply code-block segmentation to DL signals, whereby a TBS is divided into multiple CBs.

The control section 301 also controls scheduling of the UL signal based on UCI transmitted as feedback from the user terminal 20. The control section 301 also controls the receiving process (for example, at least one of demodulation, decoding, and carrier demultiplexing) for the UL signal. For example, control section 301 controls the receiving process for LTE UL signal and NR UL signal using LTE UL carrier and NR UL carrier respectively.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs a receiving process (for example, at least one of demapping, demodulation, decoding, and carrier demultiplexing, etc.) for UL signals transmitted from the user terminal 20. To be more specific, the received signal processing section 304 may output the received signals, the signals after the receiving processes and so on, to the measurement section 305. In addition, the received signal processing section 304 performs UCI receiving processes based on UL control Channel configuration commanded from the control section 301.

Also, the measurement section 305 may measure the Channel quality in UL based on, for example, the received power (for example, RSRP (Reference Signal Received Power)) and/or the received quality (for example, RSRQ (Reference Signal Received Quality)) of UL reference signals. The measurement results may be output to the control section 301. In the measurement section 305 of the NRgNB, measurement and path loss estimation are performed using the UL synchronization signal or RACH preamble transmitted from the user terminal UE.

(User Terminal)

Figure 8:
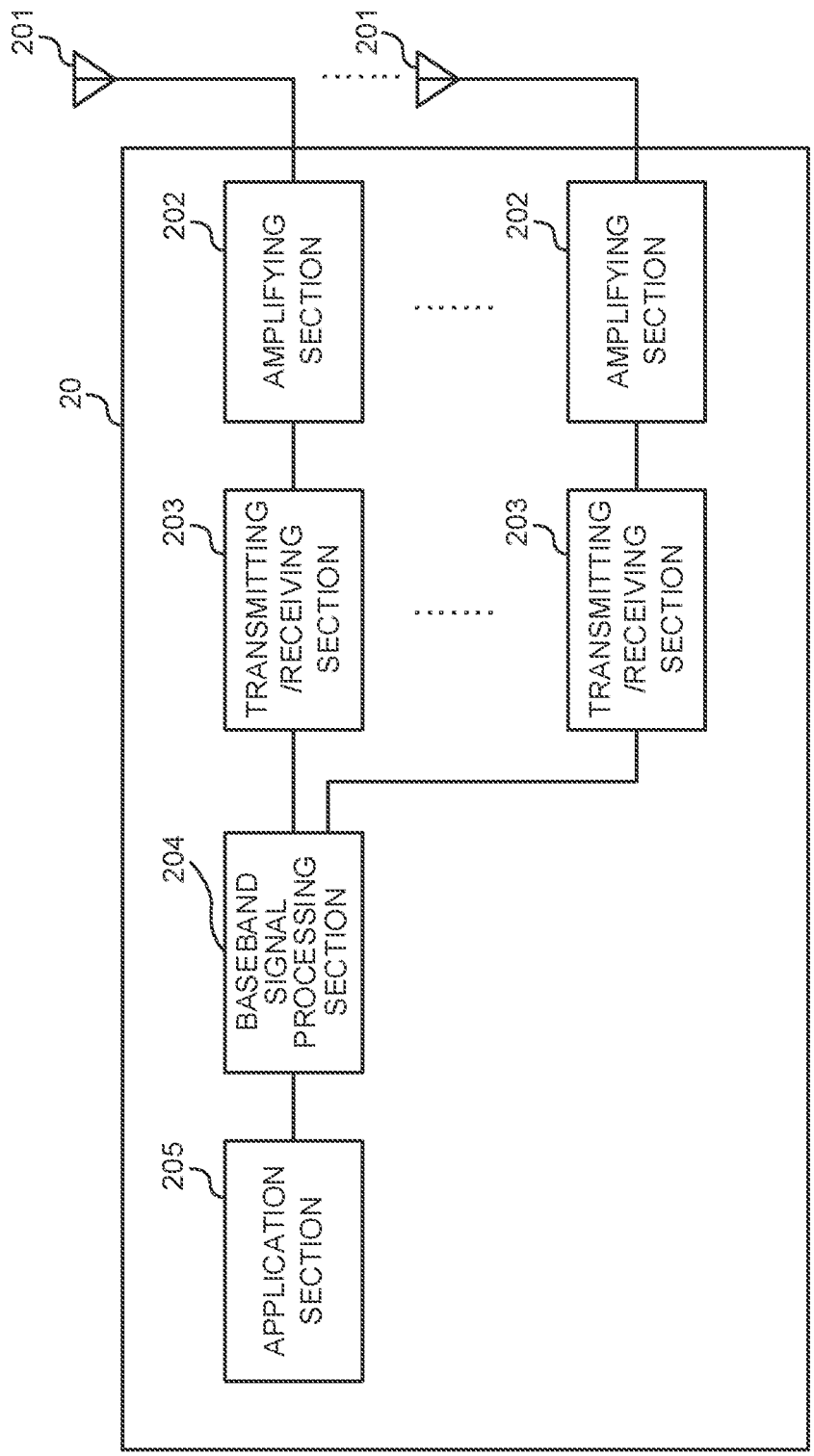
FIG. 8 is a diagram to show an exemplary overall structure of a user terminal according to the present embodiment.

FIG. 8 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 supports multiple RATs (for example LTE and NR).

Radio frequency signals that are received in a plurality of transmitting/receiving antennas 201 are each amplified in the amplifying sections 202. Each transmitting/receiving sections 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), Channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, Channel state information (CSI) and a scheduling request (SR), and/or others) is also subjected to at least one of Channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive the DL signal (for example, DCI (DL assignment for scheduling DL data, and/or UL grant for scheduling UL data), at least one of DL data, and DL reference signal) using the LTE DL carrier and/or the NR DL carrier. Also, the transmitting/receiving sections 203 transmit UL signals (for example, at least one of UL data, UCI, and UL reference signal) using LTE UL carriers and/or NR UL carriers.

The DL signal may include an LTE DL signal and/or an NR DL signal. The UL signal may include an LTE UL signal and/or an NR UL signal.

The transmitting/receiving sections 203 transmit a UL synchronization signal (UL measurement signal) for performing measurement and/or path loss estimation to an NRgNB configured with a SUL carrier. Also, the transmitting/receiving sections 203 transmit the RACH preamble for the RACH procedure, the message 3 and the like to the NRg NB configured with the SUL carrier. The transmitting/receiving sections 203 receive message 2 for the RACH procedure, message 4 and the like in the LTE eNB or NRgNB DL signal. The transmitting/receiving sections 203 receive information about UL transmit power configured based on UL synchronization signal (UL measurement signal).

Also, the transmitting/receiving sections 103 receive the delivery acknowledgement information (also referred to as "ACK/NACK," "A/N," "HARQ-ACK," "A/N Codebook," etc.) in response to the DL signal (LTE DL signal and/or NR DL signal). As to how often the retransmission control information is transmitted, for example, the retransmission control information may be transmitted per CB, per CBG, per TB or for every one or more TBs (that is, ACKs or NACKs may be indicated per CB, per CBG, per TB or for every one or more TBs). In addition, the transmitting/receiving sections 203 may receive configuration information for the unit for retransmission of DL signals and/or UL signals.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

Figure 9:
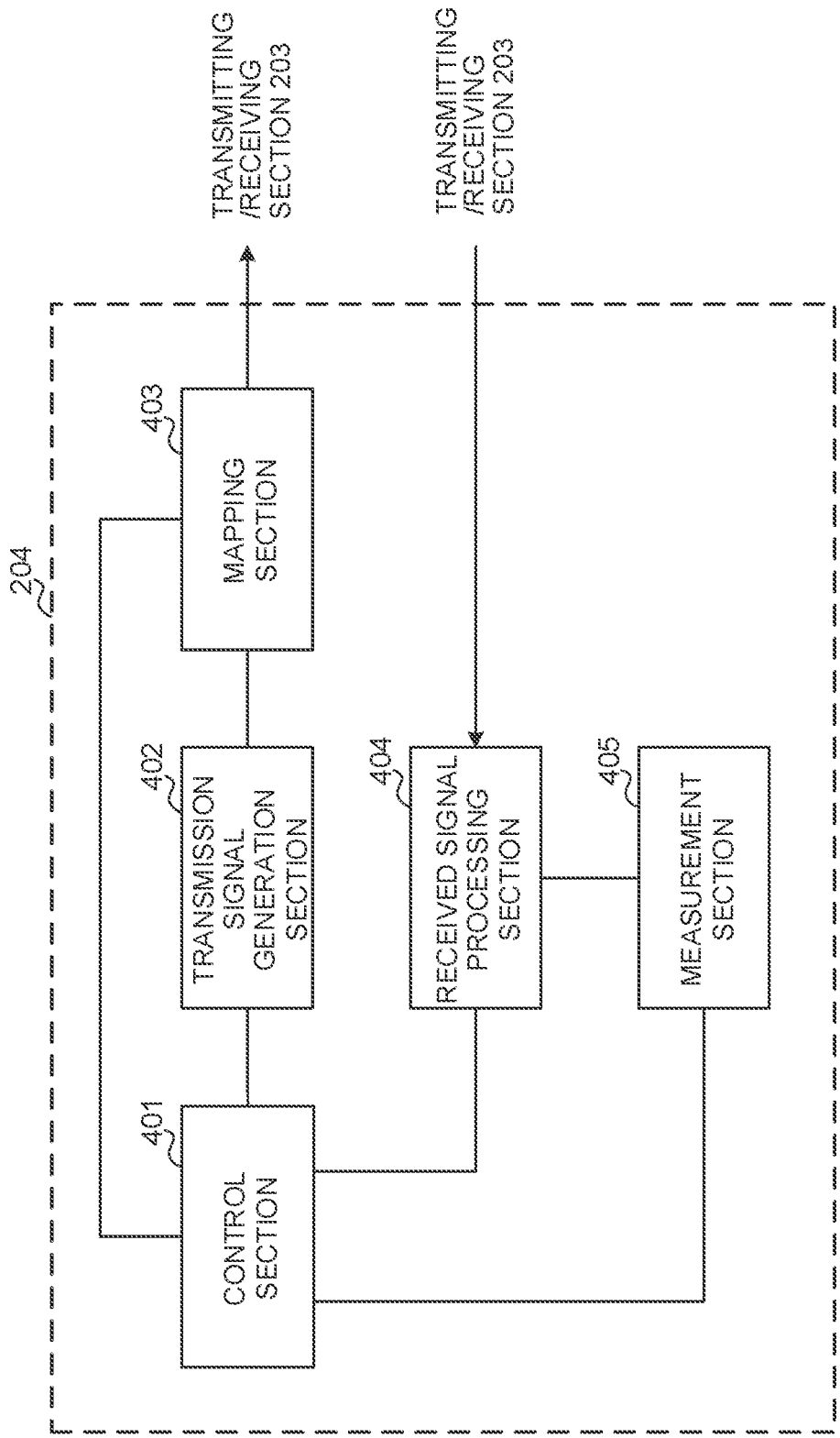
FIG. 9 is a diagram to show an exemplary functional structure of a user terminal according to the present embodiment.

FIG. 9 is a diagram to show an exemplary functional structure of a user terminal according to present embodiment. Note that, although FIG. 16 primarily shows functional blocks that pertain to characteristic parts of the present embodiment, the user terminal 20 has other functional blocks that are necessary for radio communication as well. Each MAC entity of the present embodiment may be constituted by at least one of the control section 301, the transmission signal generation section 302, and the receive signal processing section 304.

As shown in FIG. 9, the baseband signal processing section 204 provided in the user terminal 20 has a control section 401, a transmission signal generation section 402, a mapping section 403, a received signal processing section 404 and a measurement section 405. Each MAC entity of the present embodiment may be constituted by at least one of the control section 301, the transmission signal generation section 302, and the receive signal processing section 304.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

The control section 401 controls the UL synchronization signal to be sent to the SUL carrier based on the trigger (UL transmission command information). The control section 401 also controls the RACH procedure for the SUL carrier based on the command from the LTE carrier (or NR carrier). At this time, the control section 401 controls the UL transmission power to be applied to the RACH procedure based on the information on the UL transmission power.

The control section 401 controls information on the timing of UL transmission for the SUL carrier based on the information transmitted from the LTE carrier (or NR carrier). Also, if TDD is used in the LTE carrier (or NR carrier), the control section 401 may exert control so that it is not performed UL transmissions for SUL carriers in the UL subframe of the LTE carrier (or NR carrier).

To be more specific, the control section 401 controls the receiving process for DL signals in the received signal processing section 404 (for example, demodulation, decoding, each carrier's demultiplexing etc.) based on DCI (DL assignment).

Also, the control section 401 controls the generation and transmission processes (for example, encoding, modulation, mapping etc.) of UL signals based on DCI (UL grant).

The control section 401 can be constituted by a controller, a control circuit or control apparatus that can be described based on general understanding of the technical field to which the present invention pertains.

The transmission signal generation section 402 generates confirmation of receipt information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generation circuit or signal generation apparatus that can be described based on general understanding of the technical field to which the present invention pertains.

The mapping section 403 maps confirmation of receipt information for UL signals and DL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures Channel states based on reference signals (for example, CSI-RS) from the radio base station 10, and outputs the measurement results to the control section 401. Note that the Channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire and/or wireless, for example) and using these multiple pieces of apparatus.

Figure 10:
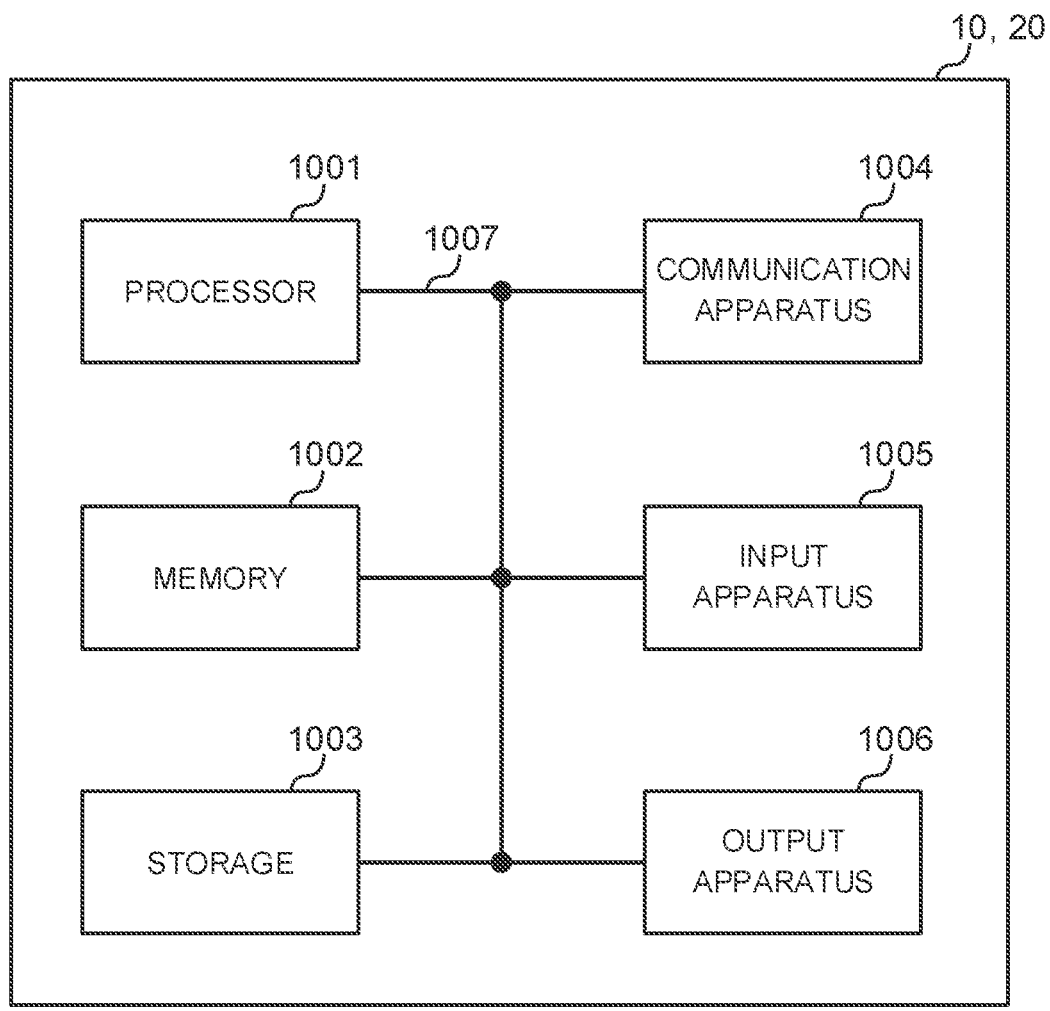
FIG. 10 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 10 is a diagram to show an example hardware structure of a radio base station and a user terminal according to present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by a least one of allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 10 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "Channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of Channel-encoded data packets (transport blocks), code blocks and/or codewords, or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various Channels (PUCCH (Physical Uplink Control Channel), PDCCH (Physical Downlink Control Channel) and so on) and information elements can be identified by any suitable names, the various names assigned to these individual Channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an uplink Channel may be interpreted as a side Channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal communicating using a first carrier performing at least Downlink (DL) transmission and a second carrier, which is a supplemental Uplink (UL), performing only UL transmission, the terminal comprising:
   a receiver that receives an indication regarding a UL that is reported from the first carrier; and
   a processor that transmits a UL signal using the UL based on the indication,
   wherein the processor controls to not transmit a Physical Uplink Control Channel (PUCCH) on the second carrier.

2. The terminal according to claim 1,
   wherein the receiver receives information on UL transmission power, and
   the processor performs a random access procedure, including transmission of message 1 and transmission of message 3, using the second carrier and controls UL transmission power for the random access procedure based on the information.

3. The terminal according to claim 2, wherein the processor controls a UL transmission timing for the second carrier, based on information transmitted from the first carrier.

4. The terminal according to claim 2, wherein when Time Division Duplex (TDD) is used on the first carrier, the processor controls not to perform the UL transmission of the second carrier at a timing of a UL subframe for the first carrier.

5. The terminal according to claim 1, wherein the processor controls a UL transmission timing for the second carrier, based on information transmitted from the first carrier.

6. The terminal according to claim 5, wherein when Time Division Duplex (TDD) is used on the first carrier, the processor controls not to perform the UL transmission of the second carrier at a timing of a UL subframe for the first carrier.

7. The terminal according to claim 1, wherein when Time Division Duplex (TDD) is used on the first carrier, the processor controls not to perform the UL transmission of the second carrier at a timing of a UL subframe for the first carrier.

8. The terminal according to claim 1, wherein the second carrier is a Supplemental Uplink (SUL) carrier, and
the indication regarding the UL is an indication regarding the SUL.

9. A radio communication method for a terminal communicating using a first carrier performing at least Downlink (DL) transmission and a second carrier, which is a supplemental Uplink (UL), performing only UL transmission, the method comprising:
receiving an indication regarding a UL that is reported from the first carrier;
transmitting a UL signal using the UL based on the indication; and
controlling to not transmit, by the terminal, a Physical Uplink Control Channel (PUCCH) on the second carrier.

10. A base station communicating using at least one of:
a first carrier performing at least Downlink (DL) transmission, and
a second carrier, which is a supplemental Uplink (UL), performing only UL transmission,
the base station comprising:
a transmitter that transmits, in the first carrier, an indication regarding a UL; and
a processor that receives a UL signal using the UL based on the indication,
wherein the processor controls to not receive a Physical Uplink Control Channel (PUCCH) on the second carrier.

11. A system comprising a terminal, communicating using a first carrier performing at least Downlink (DL) transmission and a second carrier, which is a supplemental Uplink (UL), performing only UL transmission, and a base station, wherein:
the base station comprises:
a transmitter that transmits, in the first carrier, an indication regarding a UL; and
a first processor that receives a UL signal using the UL based on the indication, and
the terminal comprises:
a receiver that receives the indication; and
a second processor that transmits the UL signal using the UL based on the indication,
wherein the second processor controls to not transmit a Physical Uplink Control Channel (PUCCH) on the second carrier.

* * * * *